(12) United States Patent
Irie et al.

(10) Patent No.: US 6,621,977 B2
(45) Date of Patent: Sep. 16, 2003

(54) OPTICAL FIBER

(75) Inventors: Shinichi Irie, Kanagawa Pref. (JP); Kenji Matsumoto, Tokyo (JP); Kengo Imamura, Kanagawa Pref. (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/169,877

(22) PCT Filed: Jan. 12, 2001

(86) PCT No.: PCT/US01/01053
§ 371 (c)(1),
(2), (4) Date: Jul. 9, 2002

(87) PCT Pub. No.: WO01/51961
PCT Pub. Date: Jul. 19, 2001

(65) Prior Publication Data
US 2003/0021576 A1 Jan. 30, 2003

(30) Foreign Application Priority Data
Jan. 14, 2000 (JP) ........................................ 2000-010228

(51) Int. Cl.⁷ ................................................. G02B 6/16
(52) U.S. Cl. ....................... 385/143; 385/123; 522/178
(58) Field of Search ................................. 385/123, 124, 385/127, 128, 143, 145; 522/6, 100, 102, 103, 113, 150, 153, 154, 178, 179, 181–183

(56) References Cited

U.S. PATENT DOCUMENTS

| | | |
|---|---|---|
| 4,704,660 A | 11/1987 | Robbins |
| 4,782,430 A | 11/1988 | Robbins et al. |
| 4,826,284 A * | 5/1989 | Sakagami et al. .......... 385/123 |
| 4,957,347 A | 9/1990 | Zarian |
| 5,052,778 A | 10/1991 | Jamshid |
| 5,067,831 A | 11/1991 | Robbins et al. |
| 5,122,580 A | 6/1992 | Zarian et al. |
| 5,149,467 A | 9/1992 | Zarian |
| 5,221,387 A | 6/1993 | Robbins et al. |
| 5,225,166 A | 7/1993 | Zarian et al. |
| 5,298,327 A | 3/1994 | Zarian et al. |
| 5,406,641 A | 4/1995 | Bigley, Jr. et al. |
| 5,684,913 A | 11/1997 | Sugiyama et al. |
| RE36,157 E | 3/1999 | Robbins et al. |
| 5,903,695 A | 5/1999 | Zarian et al. |
| 5,937,127 A | 8/1999 | Zarian et al. |
| 5,987,199 A | 11/1999 | Zarian et al. |
| 6,169,836 B1 * | 1/2001 | Sugiyama et al. .......... 385/123 |
| 6,251,311 B1 | 6/2001 | Zarian et al. |
| 6,282,355 B1 | 8/2001 | Zarian et al. |
| 6,289,150 B1 | 9/2001 | Zarian et al. |
| 6,363,197 B1 | 3/2002 | Zarian et al. |

FOREIGN PATENT DOCUMENTS

| | | | |
|---|---|---|---|
| JP | 57045502 | 3/1982 | |
| JP | 62-25706 | * 2/1987 | ................. 385/123 |
| JP | 01-15707 | 1/1989 | |
| JP | 07168029 | 4/1995 | |

* cited by examiner

Primary Examiner—John D. Lee
(74) Attorney, Agent, or Firm—Stephen W. Buckingham

(57) ABSTRACT

An optical fiber comprising a core capable of transmitting light incident from one end in the lengthwise direction toward the other end, the core consisting of a polymer of a polymerizable stock material that contains a polymerizable hydroxy monomer with a hydroxyl group in the molecule, wherein the content of the polymerizable hydroxy monomer is 0.5 to 9 wt % with respect to the total of the polymerizable stock material, and the minimum dimension (R) in the direction orthogonal to the lengthwise direction of the core and the glass transition temperature ($T_g$) of the core have a relationship represented by the following Inequality 1: $117/R+23 < T_g < 1050/R^2 + 39$ where the unit of R is mm, and the unit of $T_g$ is °C.

14 Claims, No Drawings

OPTICAL FIBER

FIELD OF THE INVENTION

The present invention relates to an improved optical fiber comprising a core made of a polymer obtained by polymerizing a polymerizable stock material containing a polymerizable hydroxy monomer, and specifically it relates to an optical fiber with excellent coloring resistance and humidity resistance properties.

BACKGROUND OF THE INVENTION

Optical fibers comprising polymer cores have been utilized in the prior art not only as optical signal transmission media for optical communications, but also as optical transmission media or light emission media for decorative and illumination purposes. In particular, for decorative purposes it has become common to use large-aperture optical fibers, having relatively large core apertures, i.e. large dimensions in the direction orthogonal to the lengthwise direction of the core (for example, a diameter of 3 mm or greater).

Such optical fibers are usually constructed of a hollow tube-shaped cladding and a core made of a light-permeable polymer with a higher refractive index than the cladding. The core is situated within the cladding, and they are usually bonded together. Suitable materials for the core include (meth)acrylate-based polymers (and copolymers) that have high transparency. The cladding may be formed from a fluorine-based polymer. The core aperture, i.e. the core dimension in the direction orthogonal to the lengthwise direction, refers to the diameter of a near-circle of the cross-sectional diagram in the direction orthogonal to the lengthwise direction of the core.

Such optical fibers comprising a core and cladding and production processes therefor are disclosed, for example, in Japanese Unexamined Patent Publication No. 57-45502, Japanese Unexamined Patent Publication No. 7-168029 and elsewhere.

For example, in Japanese Unexamined Patent Publication No.7-168029 there is disclosed a "sequential polymerization method" whereby the cladding is packed with a (meth) acrylic monomer and sequential polymerization is carried out from one end to the other in the lengthwise direction of the cladding. In this sequential polymerization method, the monomer is usually pressure-packed into a tube-shaped cladding that is sealed at one end, and the monomer-packed cladding is fixed in a heated tank and heated to polymerize the monomer for production. Here, the heating temperature (i.e. the temperature of the heat medium in the heating tank) is increased from the one end to the other for sequential polymerization of the monomer.

Incidentally, for large-aperture optical fibers, it is preferred for the glass transition temperature ($T_g$) of the core to be as low as possible in order to improve the flexibility and improve the handling properties such as bending processability and bending workability. However, using a polymer with a relatively low $T_g$ in order to reduce the $T_g$ of the core tends to result in a hygroscopic property phenomenon under high temperature and high humidity. Cores that have thus absorbed humidity, when placed in areas of low temperature, produce condensation that results in clouding that can be externally seen as white fogginess. Clouding hampers transmission of light, i.e. it lowers the transmission efficiency. This is commonly known as the phenomenon of reduced humidity resistance.

In order to improve the humidity resistance, Japanese Unexamined Patent Publication No. 64-15707 discloses an optical fiber comprising a core with improved humidity resistance, formed by copolymerizing (i) an n-butylmethacrylate monomer and (ii) a polymerizable hydroxy(meth)acrylate monomer with a hydroxyl group in the molecule. In this patent publication, the n-butylmethacrylate is used as an essential component of the copolymerizable monomer. In cores consisting of a copolymer obtained from a starting substance (stock material) containing the hydroxy(meth)acrylate monomer, the hydroxyl group introduced into the copolymer has the effect of improving the humidity resistance.

SUMMARY OF THE INVENTION

In optical fibers with a relatively low aperture (for example, a diameter of less than 3 mm), it has been necessary to add comparatively large amounts of the hydroxy monomer (for example, at least 15 wt % in the stock material in the aforementioned publication). If the hydroxy monomer is added in too small an amount, the improvement in humidity resistance is inadequate. This is because the smaller minimum dimension in the direction orthogonal to the lengthwise direction of the core compared to those of relatively larger aperture results in more rapid humidity absorption (moisture penetration) to the center of the core, causing earlier saturation by humidity absorption. However, addition of the hydroxy monomer in a large amount was found to cause coloration of the core. When the core interior is visually observed from one end of the core of an optical fiber with a length of 10 m or greater, this coloration is a phenomenon which a colored light is seen even if the light incident (introduced) to the core from the other end is white light. If such coloration phenomenon is considerable, it becomes a particular problem for practical use in the fields of decoration and illumination.

On the other hand, in optical fibers with a relatively large aperture, it has been necessary to control the $T_g$ of the core to a comparative low range to match the aperture, in order to improve the manageability (to ensure relative flexibility). When such control of the $T_g$ to a lower range is attempted by decreasing the proportion of the main monomer such as n-butylmethacrylate and increasing the amount of the hydroxy monomer which is a relatively low $T_g$ homopolymer, the same sort of core coloration occurs.

The present invention provides an optical fiber with improved coloring resistance (a property of resistance to the aforementioned coloration), without lowering humidity resistance or flexibility. The present invention provides an optical fiber comprising a core capable of transmitting incident light from one end in the lengthwise direction toward the other end, the core consisting of a polymer of a polymerizable stock material that contains a polymerizable hydroxy monomer with a hydroxyl group in the molecule, the optical fiber being characterized in that the content of the polymerizable hydroxy monomer is 0.5 to 9 wt % with respect to the total weight of the polymerizable stock material, and the minimum dimension (R) in the direction orthogonal to the lengthwise direction of the core and the glass transition temperature ($T_g$) of the core have a relationship represented by the following Inequality 1:

$$117/R+23 < T_g < 1050/R^2+39 \quad \text{(Inequality 1)}$$

where the unit of R is mm, and the unit of $T_g$ is ° C.

DETAILED DESCRIPTION OF THE INVENTION

Optical Fiber

The function and effect of the optical fiber of the invention will now be explained in detail.

The optical fiber of the invention comprises a polymer formed by polymerizing a polymerizable stock material containing a polymerizable hydroxy monomer (throughout the present specification this will be referred to either as "polymerizable hydroxy monomer" or "hydroxy monomer") having a hydroxyl group in the molecule, wherein the hydroxy monomer content is controlled to 0.5 to 9 wt % with respect to the total of the polymerizable stock material. This can provide effective improvement in the coloring resistance without excessively lowering the humidity resistance or flexibility. If the hydroxy monomer content is too low it will not be possible to effectively improve the humidity resistance, whereas if it is too high the core will be more susceptible to coloration, thus lowering the coloring resistance. With these considerations, the hydroxy monomer content is preferably controlled to the range of 0.7 to 8 wt %, and especially 0.9 to 7.5 wt %, with respect to the total of the polymerizable stock material.

The optical fiber of the invention is particularly suitable as a large-aperture optical fiber having a relatively large aperture. The aperture, or diameter, of the core is normally 4 mm or greater.

As mentioned above, the core diameter is defined as that of a near-circle in a cross-sectional diagram in the direction orthogonal to the lengthwise direction of the core (i.e., where the three-dimensional shape of the core is nearly cylindrical), but the cross-sectional shape in the direction orthogonal to the length of the core is not limited to a near circular shape. If such is the case, the minimum dimension of the cross-sectional shape in the direction orthogonal to the length, or in other words, the minimum dimension in the direction orthogonal to the lengthwise direction of the core, designated as R (hereunder referred to simply as "R" or "orthogonal dimension") is used. For example, when the cross-sectional shape in the direction orthogonal to the length is an oval shape, the short axis of the oval is defined as R.

The orthogonal dimension R of the core is usually 4 to 22 mm, preferably 4.5 to 20 mm, and especially 5 to 18 mm. If the orthogonal dimension R is too small it will be difficult to effectively increase the humidity resistance, whereas if it is too large the flexibility will be lower, possibly impairing the manageability of the core and fiber.

As mentioned above, the core $T_g$ is preferably lower if it is desired to increase the flexibility of the core, but the $T_g$ is preferably higher if it is desired to increase the humidity resistance. This relationship generally stands irrespective of the orthogonal dimension of the core (R: the diameter in cases where the core is cylindrical). However, the preferred range for the core $T_g$ will differ depending on the R value for the core. Specifically, the preferred range for the core $T_g$ is represented as a function of the core R. This will now be explained in further detail.

As mentioned above, when the orthogonal dimension R of the core is smaller, humidity absorption will occur more readily. That is, moisture penetrates at a faster rate to the center of the core (center section in the orthogonal direction to the lengthwise direction) under humidifying conditions. The moisture penetration rate is inversely proportional to the orthogonal dimension R. Thus, the ideal range for the core $T_g$ as determined for effective prevention of humidity absorption and effective increase of humidity resistance will vary in inverse proportion to the orthogonal dimension R.

On the other hand, the core flexibility (bendability) is in an inversely proportional relationship with the core elasticity, i.e. in an inverse proportion to the square of the orthogonal dimension R ($R^2$). Thus, the ideal range for the core $T_g$ as determined for effective increase in the flexibility will vary in inverse proportion to the square of the orthogonal dimension $R^2$.

To summarize this relationship in other words, it was found that the flexibility can be suitability improved and the humidity resistance can be effectively increased if the core orthogonal dimension R and the core glass transition temperature $T_g$ have the relationship represented by inequality (1) below:

$$117/R+23 < T_g < 1050/R^2+39 \qquad \text{(Inequality 1)}$$

where the unit of R is mm, and the unit of $T_g$ is °C.

The following are examples of suitable ranges for the core $T_g$ as determined by the core R.

For an R of 5 mm, a suitable range for $T_g$ is approximately 46.4 to 81.0° C.

For an R of greater than 5 mm and less than 6 mm, a suitable range for $T_g$ is approximately 46 to 69° C.

For an R of 6 mm or greater and less than 7 mm, a suitable range for $T_g$ is approximately 43 to 61° C.

For an R of 7 mm or greater and less than 8 mm, a suitable range for $T_g$ is approximately 40 to 56° C.

For an R of 8 mm or greater and less than 9 mm, a suitable range for $T_g$ is approximately 38 to 52° C.

For an R of 9 mm or greater and less than 10 mm, a suitable range for $T_g$ is approximately 36 to 50° C.

For an R of 10 mm or greater and less than 11 mm, a suitable range for $T_g$ is approximately 35 to 48° C.

For an R of 11 mm or greater and no greater than 12 mm, a suitable range for $T_g$ is approximately 34 to 46° C.

For an R of greater than 12 mm and no greater than 13 mm, a suitable range for $T_g$ is approximately 33 to 45° C.

For an R of greater than 13 mm and no greater than 14 mm, a suitable range for $T_g$ is approximately 32 to 44° C.

For an R of greater than 14 mm and no greater than 16 mm, a suitable range for $T_g$ is approximately 31 to 43° C.

For an R of greater than 16 mm and no greater than 20 mm, a suitable range for $T_g$ is approximately 30 to 42° C.

In other words, it is important to control the prescribed ranges for the core R and $T_g$, to satisfactorily maintain a balance between the humidity resistance and flexibility.

In order to increase the heat resistance of the core and to aid the effect of increased humidity resistance, it is preferred for the core polymer to be crosslinked. A crosslinked structure can effectively prevent deformation (fluidization) of the core ends under high temperature (for example, 70° C. or above). It can also serve to lower the moisture penetration rate into the core. The crosslinking may be accomplished using a crosslinking agent. The crosslinking agent content is usually in a range of 0.01 to 5 wt %, preferably 0.1 to 4.5 wt %, and especially 0.5 to 4 wt %, with respect to the total polymerizable stock material. If the crosslinking agent content is too low it may not be possible to achieve a sufficient degree of crosslinking to increase the effect of heat resistance, etc., while if the crosslinking agent content is too high, it may be difficult to satisfactorily maintain the flexibility.

Core

The core of the optical fiber according to a preferred mode of the invention is capable of transmitting light incident from one end in the lengthwise direction to the other end, and the core consists of a polymer of a polymerizable stock material containing a polymerizable hydroxy monomer with a hydroxyl group in the molecule. The content of the polymerizable hydroxy monomer is typically 0.5 to 9 wt % with respect to the total of the polymerizable stock material. In addition, the minimum dimension (R) in the direction orthogonal to the lengthwise direction of the core and the glass transition temperature ($T_g$) of the core has the relationship represented by the aforementioned inequality 1. These effects provide satisfactory flexibility and humidity resistance while improving the coloring resistance.

Here, satisfactory humidity resistance normally means a judgment of "OK" for the result of evaluation of the following properties. First, both ends of an optical fiber with a length of 30 cm are sealed using resin caps to prepare an evaluation sample. The optical fiber that is used when fabricating the sample normally has a core covered with a cladding. The caps used may be formed, for example, by combining an acrylic resin rod with an aperture equal to the outer diameter of the optical fiber (outer diameter of the cladding) and a heat-shrinkable tube made of an FEP (tetrafluoroethylene-hexafluoropropylene) resin with an inner diameter equal to the outer diameter of the optical fiber. When such caps are used, the tubes are first fitted over the cladding so that about 5 cm of both ends of the optical fiber are inserted into heat-shrinkable tubes each having a length of about 8 cm, leaving spaces where the optical fiber is not inserted in the tube. Next, a rod with a length of about 3 cm (dimension in the direction orthogonal to the radial direction) is inserted into the space in the tube and then sealed by heat shrinking. The purpose of the caps is to prevent exposure of both ends of the optical fiber.

The sample is stored for a prescribed time in an oven at 60° C., 90% RH. After storage, the sample is taken out of the oven and allowed to stand for one hour in a thermostatic tank at −10° C., and once the sample is removed from the thermostatic tank its outer appearance is visually inspected. When the core is free of white fogging the humidity resistance is judged as "OK", and when condensation due to humidity absorption has caused white fogging, the humidity resistance is judged as "NG". Upon judgment of "OK" for a given storage period, the oven storage period is gradually extended to determine the maximum time which gives a judgment of "OK". That is, a longer storage period in the 60° C., 90% RH oven indicates superior humidity resistance. A judgment of "OK" even after a storage period of 5 weeks generally indicates no problem in terms of practical use. Thus, samples judged as "OK" preferably with a storage period exceeding 5 weeks have particularly satisfactory humidity resistance.

The core usually lies along the lengthwise direction of the cladding. The peripheral surface of the core is covered by the bonded cladding, but both ends are exposed. Light from a light source can be introduced from one or both exposed ends of the core into the core without loss. The core has a level of light permeability that allows light to be transmitted from one end toward the other end.

The core is usually a solid core made of a flexible polymer. A preferred polymer is light permeable and flexible polymer alone, or a mixture of two or more thereof, such as acrylic polymers, ethylene-vinyl acetate copolymers, vinyl acetate-vinyl chloride copolymers, and the like. The core is therefore made of a polymer obtained from a polymerizable stock material containing a polymerizable monomer and/or oligomer for producing the above polymer, 0.5 to 9 wt % of a polymerizable hydroxy monomer, and if necessary a crosslinking agent. The refractive index of the polymer is usually 1.4 to 1.7, and the total light transmittance is usually 80% or greater. It is preferred for the polymer to be crosslinked in order to more effectively increase the humidity resistance of the core.

The polymerizable stock material used to form the core may be, for example, an acrylic monomer mixture. The acrylic monomer mixture usually includes (1) a non-hydroxy acrylic monomer containing no hydroxyl groups in the molecule and (2) a hydroxy acrylic monomer as the polymerizable hydroxy monomer with a hydroxyl group in the molecule. The acrylic monomer used may be any of various methacrylates or acrylates. Methacrylates are preferred. Methacrylates can be advantageously used to control the core $T_g$ to within the range prescribed above, and to effectively increase the humidity resistance and transmission efficiency (light permeability) of the optical fiber. So long as the purpose of the invention is not impeded, an acrylic oligomer formed by polymerizing two or more monomers may also be used. Incidentally, two or more monofunctional monomers may also be used as crosslinking agents together with a monofunctional monomer (or oligomer).

As specific examples of non-hydroxy acrylic monomers there may be mentioned methacrylic acid esters (methacrylates) containing no hydroxyl groups, such as methyl methacrylate, ethyl methacrylate, n-butyl methacrylate, isobutyl methacrylate, t-butyl methacrylate, 2-ethylhexyl methacrylate, lauryl methacrylate, tridecyl methacrylate, stearyl methacrylate, cyclohexyl methacrylate, tetrahydrofurfuryl methacrylate, isodecyl methacrylate, isobornyl methacrylate, isostearyl methacrylate, etc., and acrylic acid esters (acrylates) containing no hydroxyl groups, such as methyl acrylate, ethyl acrylate, n-butyl acrylate, 2-ethylhexyl acrylate, isoamyl acrylate, lauryl acrylate, stearyl acrylate, tetrahydrofurfuryl acrylate, isobornyl acrylate, isooctyl acrylate, isomyristyl acrylate, isostearyl acrylate, etc. Because methacrylic acid esters generally have a lower polymerization rate than acrylate acid esters, their polymerization is easier to control. Using these monomers as main components can also more easily restrict the core $T_g$ to the prescribed range.

As monomers among methacrylic acid esters that result in low coloration of the core there are preferred methyl methacrylate, ethyl methacrylate, n-butyl methacrylate, 2-ethylhexyl methacrylate, isobutyl methacrylate, t-butyl methacrylate, lauryl methacrylate, tridecyl methacrylate, stearyl methacrylate, and the like.

In addition to these methacrylates there may also be used n-butyl acrylate, methyl acrylate, 2-ethylhexyl acrylate, ethyl acrylate, dodecyl methacrylate, acrylic acid, methacrylic acid, and the like.

As specific examples of hydroxy acrylic monomers there may be mentioned 2-hydroxyethyl methacrylate, 2-hydroxyethyl acrylate, 2-hydroxypropyl methacrylate, 2-hydroxypropyl acrylate, 3-hydroxypropyl methacrylate, 3-hydroxypropyl acrylate, diethyleneglycol monomethacrylate, diethyleneglycol monoacrylate, triethyleneglycol monomethacrylate and triethyleneglycol monoacrylate.

Examples of crosslinking agents that may be used for crosslinking of the core polymer include polyfunctional monomers such as diallyl phthalate, triethyleneglycol di(meth)acrylate and diethyleneglycol bisallylcarbonate.

As examples of acrylic monomer mixtures that are preferably used for the invention there may be mentioned:

(1) mixtures consisting of 2-hydroxyethyl methacrylate, methyl methacrylate, n-butyl methacrylate and triethyleneglycol di(meth)acrylate, (2) mixtures consisting of 2-hydroxyethyl methacrylate, n-butyl methacrylate and triethyleneglycol di(meth)acrylate, and (3) mixtures consisting of 2-hydroxyethyl methacrylate, n-butyl methacrylate, 2-ethylhexyl methacrylate and triethyleneglycol di(meth)acrylate.

There are no particular restrictions on the mixing ratio of each monomer besides the hydroxy acrylic monomer and the optional crosslinking monomer in the acrylic monomer mixture. It may be appropriately selected in order to control the $T_g$ of the polymer (core) within the prescribed range. However, when the monomer mixture contains n-butyl methacrylate, the ratio of the n-butyl methacrylate is usually 30–98 wt %, preferably 40 to 97 wt % and more preferably 42 to 96 wt %.

Thus, the polymerizable stock material composition may be appropriately determined in connection with the core R to satisfy the relationship between R and the core $T_g$, for improved coloring resistance and humidity resistance.

The core length (during use) is usually the same as the length of the cladding, which is normally from 50 cm to 100 m. The cross-section of the core in the direction of its diameter is usually nearly circular or nearly oval, but other shapes are also possible so long as the effect of the invention is not impeded.

Additives may also be added to the core so long as they do not impede the effect of the invention. Suitable additives include plasticizers, surfactants, coloring agents, stabilizers (for heat resistance, oxidation resistance, ultraviolet resistance, etc.), and the like.

Fabrication Process for Optical Fiber

The optical fiber of the invention is generally fabricated by packing the polymerizable stock material into a tube-shaped cladding running along the lengthwise direction and accomplishing polymerization inside the cladding to form a polymer core covered with the cladding. A preferred example of the fabrication process will now be explained.

First, the cladding (cladding tube) is prepared. The cladding is usually formed by extrusion molding to prescribed dimensions including thickness, inner diameter and length.

The cladding formed in this manner is then usually set in a feed apparatus. The cladding set in the feed apparatus is wound up by driving a winding apparatus. Using the feed apparatus and the winding apparatus in combination, the cladding that is continuous in the lengthwise direction is conveyed at a prescribed conveying speed into a heating tank (a tank filled with a heating medium, such as a hot water tank) which is situated between the feed apparatus and the winding apparatus, and is passed through the heating tank.

The vessel of the heating tank is usually provided with two openings, at the cladding introduction end (on the feed apparatus side) and the cladding exit end (on the winding apparatus side), to allow the cladding to feed through. An opening may also be provided only at one end in the lengthwise direction of the vessel. In that case, for example, the vessel is oriented roughly along the vertical direction and the single opening of the vessel is directed upward in the vertical direction. The sealed end of the cladding is set in through the opening and its direction is inverted near the bottom of the vessel (lower section in the vertical direction), the cladding being conveyed so that the sealed end returns out through the opening. The stock material-packed cladding is thus immersed in the heating medium to complete formation (polymerization) of the core, after which the optical fiber is drawn out from the opening.

The polymerizable stock material is usually packed into the cladding under pressure. Here, one end of the cladding in its lengthwise direction is usually sealed, and the stock material is pressure-packed from the other end of the cladding. The cladding may be sealed, for example, by fitting a metal stopper or bulb into the opening at the end of the cladding. For packing of the stock material through the opening at the other end of the cladding, the opening at the other end of the cladding is usually contacted with the stock material (commonly in liquid form) in the stock material tank, and the stock material is continuously pressure-packed into the cladding while maintaining a positive pressure in the tank.

In this manner, thermal polymerization of the stock material is initiated and completed in the cladding which is conveyed into the heating tank, to thus fabricate an optical fiber comprising a core bonded to a cladding.

The temperature of the heating tank is normally 35 to 90° C., and preferably 40 to 85° C. The time the stock material-packed cladding is resident in the heating tank (the residence time) is not particularly limited, but is usually from 10 minutes to 5 hours, and preferably from 15 minutes to 3 hours. The length of the cladding used for fabrication is usually 10 to 3000 m, and preferably 20 to 2000 m.

The elastic modulus of the cladding is generally 10 to 700 MPa, and preferably 20 to 600 MPa. Here, the "elastic modulus" of the cladding is the value at the heating temperature. The thickness of the cladding is usually 0.01 to 2 mm, preferably 0.05 to 1.5 mm, and more preferably 0.2 to 1 mm. If the thickness is too small the humidity resistance may be reduced, and if it is too large the flexibility may be reduced. The inner diameter of the cladding (the diameter) may be set to match the value designed for the core diameter after polymerization.

The material for the cladding is not particularly restricted, but is usually a polymer such as tetrafluoroethylene-hexafluoropropylene (FEP), tetrafluoroethylene-hexafluoropropylene-vinylidene fluoride, trifluoroethylene-vinylidene fluoride, polymethylpentene, ethylene-vinyl acetate copolymer, vinyl acetate-vinyl chloride copolymer, or the like.

Additives may be added to the cladding so long as the effect of the invention is not impeded. Suitable additives include plasticizers, surfactants, curing agents, fillers such as white pigments, coloring agents such as dyes, stabilizers, and the like.

Method of Using Optical Fiber

The optical fiber of the invention can be used as a structural part in a light emitting device that is useful for various purposes in illumination devices, lightings, advertising boards, variable displays, road markers, etc. that are in separate locations from light sources. That is, the optical fiber of the invention can be effectively used both in end light emission modes where light incident into one end of the core is emitted from the other end, and in lateral light emission modes where emission (light leakage) occurs from the side (or periphery) of the core.

High-brightness lamps such as xenon lamps, halogen lamps and flash lamps may be advantageously used as light sources. The consumption power of the lamp is usually 10 to 500 W.

EXAMPLES

Fabrication of Optical Fibers

Tetrafluoroethylene-hexafluoropropylene FEP100J (product number) by Mitsui-DuPont, KK. was used as a cladding material to mold claddings using a Φ50 mm, L/D=26 extruder. The inner diameters of the claddings were designed so that the core diameter (core R) of each finished optical fiber (upon complete polymerization of core and complete bonding of cladding) had the value shown in Table 1. Each molded cladding was cut to 30 m, mixtures of bis(4-t-butylcyclohexyl) peroxydicarbonate added as an initiator to the polymerizable stock materials having the compositions listed in Table 1 were pressure-packed into each cladding, and the stock materials were polymerized in the claddings to obtain the optical fibers for each example.

TABLE 1

| | Core diameter meter (mm) | 2-Hydroxyethyl methacrylate | Methyl methacrylate | n-Butyl methacrylate | 2-Ethylhexyl methacrylate | Triethyleneglycol dimethacrylate | Core $T_g$ (° C.) | Humidity resistance (weeks) | Flexural load (kg) | Coloring resistance |
|---|---|---|---|---|---|---|---|---|---|---|
| Example 1 | 9 | 4 | 0 | 96 | 0 | 1 | 46 | >5 | 4.5 | ◯ |
| Example 2 | 9 | 7 | 0 | 35 | 58 | 1 | 36 | >5 | 3.4 | ◯ |
| Example 3 | 5 | 4 | 40 | 56 | 0 | 1 | 76 | >5 | 5.3 | ◯ |
| Example 4 | 5 | 4 | 23 | 73 | 0 | 1 | 63 | >5 | 4.8 | ◯ |
| Example 5 | 5 | 4 | 15 | 81 | 0 | 1 | 56 | >5 | 4.4 | ◯ |
| Example 6 | 5 | 4 | 10 | 86 | 0 | 1 | 53 | >5 | 4.2 | ◯ |
| Example 7 | 5 | 4 | 5 | 91 | 0 | 1 | 50 | >5 | 3.5 | ◯ |
| Example 8 | 7 | 4 | 15 | 81 | 0 | 1 | 56 | >5 | 5.4 | ◯ |
| Example 9 | 7 | 4 | 10 | 86 | 0 | 1 | 53 | >5 | 4.5 | ◯ |
| Example 10 | 7 | 4 | 5 | 91 | 0 | 1 | 50 | >5 | 3.5 | ◯ |
| Example 11 | 9 | 4 | 5 | 91 | 0 | 1 | 50 | >5 | 5.2 | ◯ |
| Example 12 | 9 | 4 | 0 | 65 | 31 | 1 | 39 | >5 | 3.6 | ◯ |
| Example 13 | 12 | 4 | 0 | 96 | 0 | 1 | 46 | >5 | 5.8 | ◯ |
| Example 14 | 12 | 4 | 0 | 65 | 31 | 1 | 39 | >5 | 4 | ◯ |
| Example 15 | 18 | 4 | 0 | 65 | 31 | 1 | 39 | >5 | 5.9 | ◯ |
| Example 16 | 18 | 4 | 0 | 44 | 52 | 1 | 34 | >5 | 4.9 | ◯ |
| Comp.Ex. 1 | 9 | 10 | 0 | 28 | 62 | 1 | 36 | >5 | 3.2 | ◯ |
| Comp.Ex. 2 | 7 | 4 | 40 | 56 | 0 | 1 | 76 | >5 | 7.8 | ◯ |
| Comp.Ex. 3 | 7 | 4 | 23 | 73 | 0 | 1 | 63 | >5 | 6.4 | ◯ |
| Comp.Ex. 4 | 12 | 4 | 5 | 91 | 0 | 1 | 50 | >5 | 6.8 | ◯ |
| Comp.Ex. 5 | 18 | 4 | 0 | 96 | 0 | 1 | 46 | >5 | 8.5 | ◯ |
| Comp.Ex. 6 | 18 | 4 | 0 | 84 | 12 | 1 | 43 | >5 | 7 | ◯ |
| Comp.Ex. 7 | 5 | 4 | 0 | 96 | 0 | 1 | 46 | 4 | 2.6 | ◯ |
| Comp.Ex. 8 | 7 | 4 | 0 | 65 | 31 | 1 | 39 | 3 | 2.8 | ◯ |
| Comp.Ex. 9 | 18 | 4 | 0 | 0 | 96 | 1 | 22 | 3 | 2.6 | ◯ |

Evaluation of Optical Fibers (1) Humidity Resistance Evaluation

An evaluation sample was prepared in the manner described above for each example. Each sample was stored for a prescribed period in an oven at 60° C., 90% RH (oven storage time). After then standing for one hour in a thermostatic tank at −10° C., the humidity resistance was judged as "NG" if the core showed white fogging, and the value (length) of the oven storage time was recorded as the humidity resistance evaluation value. If the core showed no white fogging and the humidity resistance was judged as "OK", the oven storage time was extended and the same evaluation was repeated until the core showed fogging. Those samples whose cores showed no fogging even with an oven storage time of 5 weeks were given evaluation values of ">5 (weeks)".

(2) $T_g$ Evaluation

The core $T_g$ for the optical fiber of each example was measured with a viscoelasticity tester (Model No.: RSAII, product of Rheometrics, KK.). The measuring conditions were: compression mode, frequency=1 rad/s, temperature elevating rate=1° C./min. The $T_g$ was defined as the peak temperature for tan δ.

(3) Bending Property Evaluation

Each of the optical fibers was cut to 1 m, and the load required for 90° bending with a curvature radius (r) of 8 times the core diameter was measured. Those samples having loads exceeding 6 kg were judged as exhibiting a considerable problem for working, such as optical fiber feedthrough and bending. The measurement was accomplished by anchoring one end of the fiber, connecting the opposite end to a load-measuring apparatus, and determining the load for 90° winding along the outer perimeter of a stainless steel cylinder with an outer diameter equivalent to each "r". The measurement results are shown in the table.

(4) Coloring Resistance Evaluation

Each of the optical fibers was cut to 10 m and visually observed from the end of the core to the interior of the core; the sample was judged as "OK" (circle mark in the table) if no coloration was observed, and as "NG" (x mark in the table) if coloration such as yellowing was observed.

As shown by the evaluation results for each example in Table 1, the optical fibers of the examples according to the invention exhibited superiority in all of the properties of coloring resistance, humidity resistance and flexibility (bending property).

The optical fiber of the invention has a level of coloring resistance that avoids problems of practical use with lengths of 10 m and greater, and sufficient flexibility and humidity resistance for practical use are exhibited by the optical fiber with a wide range of apertures (core R values).

What is claimed is:

1. An optical fiber comprising a core capable of transmitting light incident from one end in the lengthwise direction toward the other end, said core comprising:
   a polymer of a polymerizable stock material that contains a polymerizable hydroxy monomer with a hydroxyl group in the molecule,
   wherein polymerizable hydroxy monomer of said optical fiber is 0.5 to 9 wt % with respect to the total weight of said polymerizable stock material, and the minimum dimension (R) in the direction orthogonal to the lengthwise direction of said core and the glass transition temperature ($T_g$) of said core have a relationship represented by the following equation:

$$117/R+23<T_g<1050/R^2+39$$

where the unit of R is mm, and the unit of $T_g$ is ° C.

2. The optical fiber of claim 1, wherein the polymer of said core is crosslinked.

3. The optical fiber of claim 1, wherein the polymer of said core is crosslinked by a crosslinking agent, the content of the crosslinking agent being in the range of 0.01 to 5 wt % with respect to the total of said polymerizable stock material.

4. The optical fiber of claim 1, wherein the polymerizable stock material is selected from the group consisting of acrylic polymers, ethylene-vinyl acetate copolymers, vinyl acetate-vinyl chloride copolymers, and combinations thereof.

5. The optical fiber of claim 1, wherein the refractive index of the polymer is from 1.4 to 1.7.

6. The optical fiber of claim 1, wherein the polymer has a total light transmittance of greater than 80 percent.

7. An optical fiber containing a core capable of transmitting light, said optical fiber comprising:

a polymeric core containing a polymerizable hydroxy monomer with a hydroxyl group in the molecule, the core having a lengthwise direction and a direction orthogonal to the lengthwise direction;

wherein the minimum dimension (R) in the direction orthogonal to the lengthwise direction of said core and the glass transition temperature ($T_g$) of said core have a relationship represented by the following equation:

$$117/R+23<T_g<1050/R^2+39$$

where the unit of R is mm, and the unit of $T_g$ is °C.

8. The optical fiber of claim 7, wherein the polymerizable hydroxy monomer comprises up to 9 wt % of the total weight of the polymerizable stock material.

9. The optical fiber of claim 7, wherein the polymerizable hydroxy monomer comprises greater than 0.5 wt % of the total weight of the polymerizable stock material.

10. The optical fiber of claim 7, wherein the polymerizable hydroxy monomer of the core is crosslinked.

11. The optical fiber of claim 7, wherein the polymerizable hydroxy monomer of said core is crosslinked by a crosslinking agent, the content of the crosslinking agent being in the range of 0.01 to 5 wt % with respect to the total of said polymerizable stock material.

12. The optical fiber of claim 7, wherein the polymerizable hydroxy monomer is selected from the group consisting of acrylic polymers, ethylene-vinyl acetate copolymers, vinyl acetate-vinyl chloride copolymers, and combinations thereof.

13. The optical fiber of claim 7, wherein the refractive index of the polymer is from 1.4 to 1.7.

14. The optical fiber of claim 7, wherein the polymer has a total light transmittance of greater than 80 percent.

* * * * *